(No Model.)
C. N. PETESCH.
HEATING FEED WATER.
No. 308,376. Patented Nov. 25, 1884.
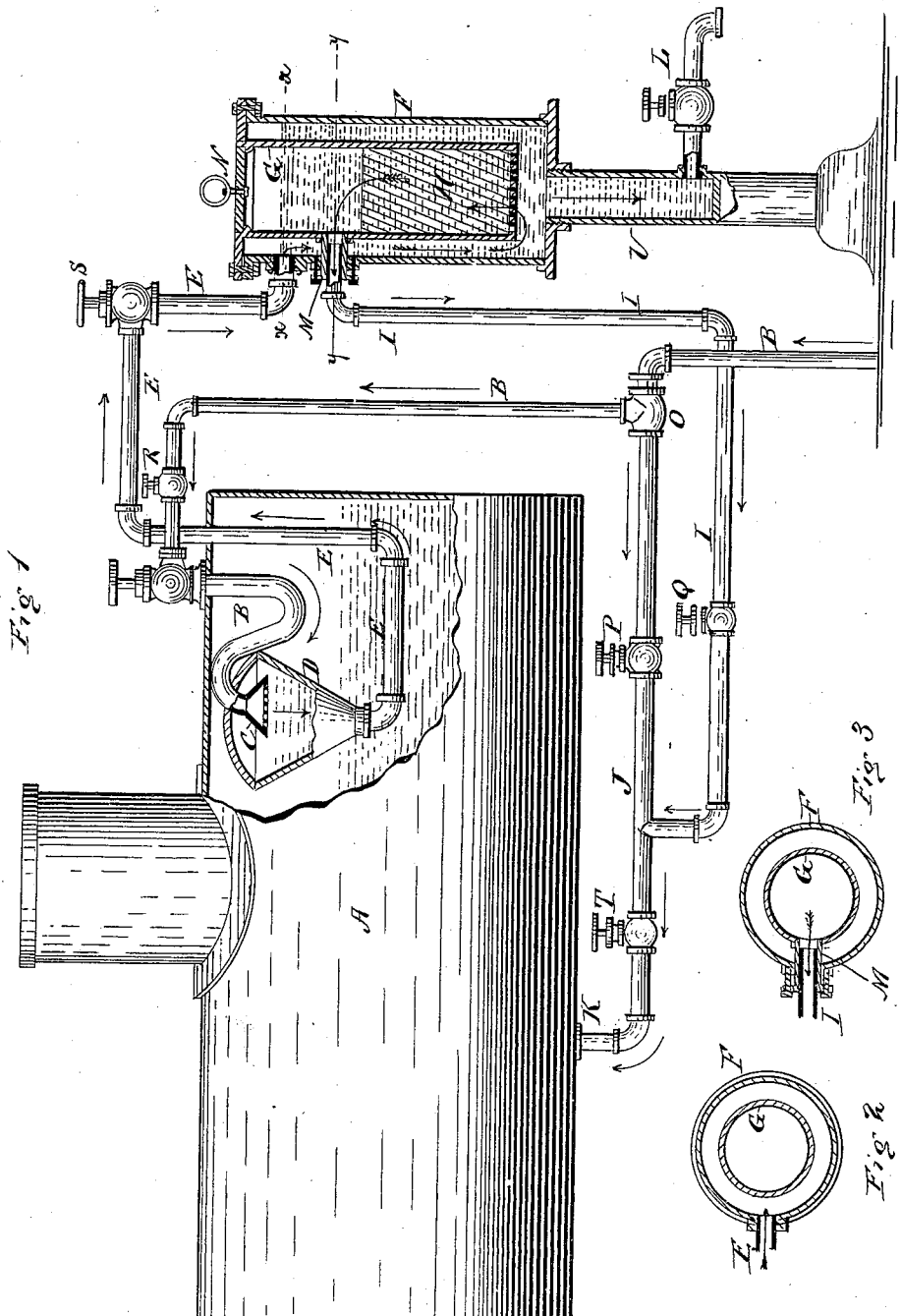
Witnesses
W. C. Corliss
A. M. Best
Inventor
Charles N. Petesch
By Coburn & Thacher
Attorneys

UNITED STATES PATENT OFFICE.

CHARLES N. PETESCH, OF CHICAGO, ILLINOIS.

HEATING FEED-WATER.

SPECIFICATION forming part of Letters Patent No. 308,376, dated November 25, 1884.

Application filed January 28, 1884. (No model.)

*To all whom it may concern:*

Be it known that I, CHARLES N. PETESCH, a citizen of the United States, residing at Chicago, county of Cook, and State of Illinois, have invented certain new and useful Improvements in Heating Feed-Water, which are fully set forth in the following specification, reference being had to the accompanying drawings, in which—

Figure 1 represents a side elevation of my improvement with a certain portion of the boiler cut away and a sediment-chamber made in vertical central section, showing the interior structure thereof; Fig. 2, a transverse section taken at the line $x$ $x$, Fig. 1; and Fig. 3, a transverse section taken at the line $y$ $y$, Fig. 1.

My invention relates to that class of boiler-feeders in which the water is first heated and then allowed to settle and the sediment removed from the water before it passes into the boiler to be converted into steam.

My invention consists in the devices and combination of devices hereinafter fully described, and made the subject-matter of the claims.

In the accompanying drawings, A represents a boiler constructed in any of the well-known and approved methods of constructing boilers for generating steam.

B is a water-pipe leading from a force-pump or any other water-supply source, and extends into the top of the boiler, as clearly shown in the drawings.

C is a perforated plate attached to the end of the water-pipe B, for the purpose of spraying the water as it passes from the water-pipe B.

D is a chamber placed within the boiler A, into which the end of the water-pipe B extends, and into which the water is sprayed as it passes from the pipe B.

E is a water-pipe leading from the chamber D out of the boiler into the sediment-chamber F. The hot water passing from the chamber D through the pipe E into the sediment-chamber F deposits therein any sediment which it contains.

G is a filter placed within the chamber F. The bottom of this filtering-chamber is perforated, which perforations open into the chamber F.

H is a filtering material placed in the filter G, extending above the perforations, so that the water which passes through the pipe E into the chamber F passes through the filtering material H into the top of the filter, and passes out through the pipe I into the pipe J, and thence into the boiler at K.

L is a faucet attached to the bottom of the sediment-chamber F, for drawing off the sediment from said chamber.

M is a short packing-box leading from the filter G out through the wall of the sediment-chamber F, and is bolted to said wall, as shown, and the pipe I passes into this short packing-box. This is for the purpose of making a tight outlet from the upper portion of the filter G through the pipe I, and also enabling the removal of the filter G for the purpose of cleaning said filter.

N is a removable cover to the filter G, which is fitted closely and tightly, so as to be water-tight, and so that the pressure of the water in the filter will not remove it. One end of the pipe J is connected to the water-pipe B at the three-way joint O. It also is provided with a stop-cock, P, which is ordinarily kept closed. The pipe I is also provided with a stop-cock, Q, and the pipe B with a stop-cock, R, and the pipe E with a stop-cock, S. The pipe J is also provided with a stop-cock, T. By closing the stop-cock R in the pipe B and the stop-cock Q in the pipe I and opening the stop-cocks P and T in the pipe J, water can be fed directly from the pipe B into the boiler; but as I ordinarily use my improvement, when all the parts are in order to operate as above described, the stop-cock P is kept closed, so that the water passes through the pipe B into the chamber D in the boiler, where it becomes heated, and from thence out into the sediment-chamber and through the filter and pipes I and J into the boiler, as indicated by the arrows in said drawings. The stop-cock S in the pipe E can be closed whenever the filter is undergoing repairs, and during such interval the water can be fed directly from the pipe B into the boiler A, as above described.

U is a hollow standard, to which the sediment-chamber F is screwed, as shown; and when it is desired the chamber can be removed from the standard and the solid matter in the bottom of said chamber or in the standard which cannot be drawn off through the faucet L can be removed. By heating the water in the pipe B and then spraying it into the chamber D and forcing it while hot through the pipe E into the sediment-chamber F, where the coarser material will settle, and then through the filter G, I am enabled to remove all of the solid matter from said water before it is finally fed into the boiler, and I thereby prevent any incrustation of the boiler, which is so objectionable.

By constructing the sediment-chamber and filter so that I can renew the filtering material and clean the sediment-chamber, I am enabled to keep the feeding apparatus constantly in a proper working condition to perform the work required.

Having thus fully described the construction and operation of my invention, what I claim, and desire to secure by Letters Patent, is—

1. The combination of the water-pipe B, leading into the boiler, the closed chamber D, placed within the boiler, the pipe E, leading from the boiler into a reservoir outside of the boiler, the pipe I, leading from said reservoir, conducting the water back into the boiler, and a boiler, substantially as specified and shown.

2. The pipes B, E, I, and J, provided with stop-cocks, substantially as shown, in combination with the boiler A and a sediment chamber or reservoir located outside of the boiler, substantially as specified and shown.

CHARLES N. PETESCH.

Witnesses:
W. C. CORLIES,
G. E. FAULKNER.